United States Patent
Hino et al.

(10) Patent No.: US 8,013,490 B2
(45) Date of Patent: Sep. 6, 2011

(54) ARMATURE

(75) Inventors: Tatsuro Hino, Chiyoda-ku (JP);
Hiroyuki Akita, Chiyoda-ku (JP);
Takumi Nakaue, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 142 days.

(21) Appl. No.: 12/579,882

(22) Filed: Oct. 15, 2009

(65) Prior Publication Data

US 2010/0264773 A1    Oct. 21, 2010

(30) Foreign Application Priority Data

Apr. 21, 2009  (JP) .................................. 2009-102900

(51) Int. Cl.
*H02K 3/34* (2006.01)

(52) U.S. Cl. ......... 310/194; 310/198; 310/270; 310/215

(58) Field of Classification Search .................. 310/194, 310/195, 198, 214, 215, 260, 270
See application file for complete search history.

(56) References Cited

U.S. PATENT DOCUMENTS

| | | | |
|---|---|---|---|
| 6,590,310 B2 * | 7/2003 | Takano | 310/216.074 |
| 6,633,102 B2 * | 10/2003 | Nagai et al. | 310/215 |
| 6,707,225 B2 * | 3/2004 | Bradfield | 310/260 |
| 6,741,009 B1 * | 5/2004 | Ando et al. | 310/254.1 |
| 6,984,911 B2 * | 1/2006 | Horie et al. | 310/194 |
| 7,649,295 B2 * | 1/2010 | Fukui et al. | 310/215 |

FOREIGN PATENT DOCUMENTS

| | | |
|---|---|---|
| JP | 9-037498 A | 2/1997 |
| JP | 9-149573 A | 6/1997 |
| JP | 11-027886 A | 1/1999 |
| JP | 2008-092654 A | 4/2008 |

* cited by examiner

*Primary Examiner* — Dang D Le
(74) *Attorney, Agent, or Firm* — Buchanan Ingersoll & Rooney PC

(57) ABSTRACT

An armature includes a plurality of armature elements, wherein each of the armature elements has an armature element core that has a predetermined core length and has end faces spaced apart in a core length direction and side faces connecting the end faces, a first coil that is formed by winding a wire over the side faces and the end faces, a second coil that is formed, after forming the first coil, by winding a wire over the side faces and the end faces so that on the side faces the second coil is formed contiguously to the first coil, and an end structure member that is provided on each of the end faces, has a first-winding face and a second-winding face on which the wires of the first coil and the second coil are wound, respectively, and has a riser formed between the first-winding face and the second-winding face, the end structure member in which a vicinity of the riser on the second-winding face is positioned farther from the each of the end faces than the first-winding face.

6 Claims, 28 Drawing Sheets

ARMATURE

BACKGROUND OF THE INVENTION

1. Field of the Invention

The present invention relates to armatures used in rotating electric machines, linear motors, and the like.

In response to developments of new technologies for various kinds of products using motors, there have been growing demands for space saving and high performance in rotating electric machines for driving, linear motors, and the like. In general, when a current flowing through a coil needs to be increased, the diameter of a wire for the coil is presumably increased; however, this increases rigidity of the coil, causing difficulty in winding the wire around its core. Therefore, often adopted is a method of making a coil wound around a core in a manner in which a wire having a smaller diameter is used so that the number of wire turns is increased. In a rotating electric machine including an armature provided with armature elements each having two coils, wires are wound in such a way that, in a region where the two coils abut each other, each upper winding is positioned on the trough created between lower adjacent windings, thereby aiming at reducing the dead spaces so as to realize a high density coil assembly (for example, Japanese Patent Laid-Open No. 2008-92654 (page 5-7, FIG. 2)).

2. Description of the Related Art

Rotating electric machines conventionally includes an armature provided with a plurality of armature elements composed of a plurality of pole teeth projecting radially inwardly from a ring-shaped yoke and coils wound around the pole teeth. In order to wind wires around such pole teeth, an automatic winding machine is used. To wind a wire around each of the pole teeth, the automatic winding machine moves a nozzle a coil-wire feeder to a position between the pole teeth; then, the automatic winding machine moves, feeding the wire from the tip of the nozzle, the nozzle in the yoke's central axis directions and in the yoke's radial directions while pivoting the yoke around the yoke's central axis. When accurately positioning, as described above, each upper winding layer on the trough created between lower adjacent windings, it is necessary to precisely control the position of the nozzle tip; however, the movement speed of the nozzle head is required to be increased for raising productivity, inevitably leading to an insufficient accuracy in positioning the nozzle tip.

A boundary plane between the two coils is determined by the outermost developed face of wire stack of the initially wound first coil, and respective positions of the windings in a conventional armature element depend only the location of the nozzle tip; then, the insufficient accuracy in positioning the nozzle tip due to the reasons mentioned above sometimes causes insufficient accuracy in positioning the windings, resulting in inaccurately determining the boundary plane and failing to form a neatly aligned winding in accordance with design drawings; this has led a problem in that it is difficult to practically produce high density windings.

The present invention is made to cope with the problems described above, and aims for an armature including a plurality of armature elements in each of which a boundary plane between two coil windings can be determined by their adjacent region and high density windings are realized by accurately winding wires in a neatly aligned manner.

SUMMARY OF THE INVENTION

An armature according to the present invention includes a plurality of armature elements, wherein each of the armature elements is composed of an armature element core that has a predetermined core length and has end faces spaced apart in a core length direction and side faces connecting the end faces; a first coil that is formed by winding a wire over the side faces and the end faces; a second coil that is formed, after forming the first coil, by winding a wire over the side faces and the end faces so that on the side faces the second coil is formed contiguously to the first coil; and an end structure member.

Here, the end structure member is provided on each of the end faces, has a first-winding face and a second-winding face on which the wires of the first coil and the second coil are wound, respectively, and has a riser formed between the first-winding face and the second-winding face; and a vicinity of the riser on the second-winding face is positioned farther from the each of the end faces than the first-winding face.

In the armature element according to the present invention, the riser is formed between the first-winding face and the second-winding face, and a vicinity of the riser on the second-winding face is positioned farther from the each of the end faces than the first-winding face. The first coil is initially wound so as to be contiguous to the riser; therefore, even when the automatic winding machine controls the nozzle tip position with a little less accuracy, a boundary plane of the first coil can be arranged at the armature element ends at a predetermined position according to the riser.

As wires are wound being tensioned, a boundary plane of the first coil wound over the sides face of the armature element core can also be arranged at the predetermined position according to the riser. The second coil is wound along the boundary plane of the first coil wound over the side faces, so that a boundary plane of the second coil bordering on the first coil can be formed at a predetermined position, resulting in neatly aligned windings.

As described above, both the first coil and the second coil can be wound in a neatly aligned manner as designed, realizing high density wound coils.

DETAILED DESCRIPTION OF THE PREFERRED EMBODIMENTS

Embodiment 1

Figure 1A:
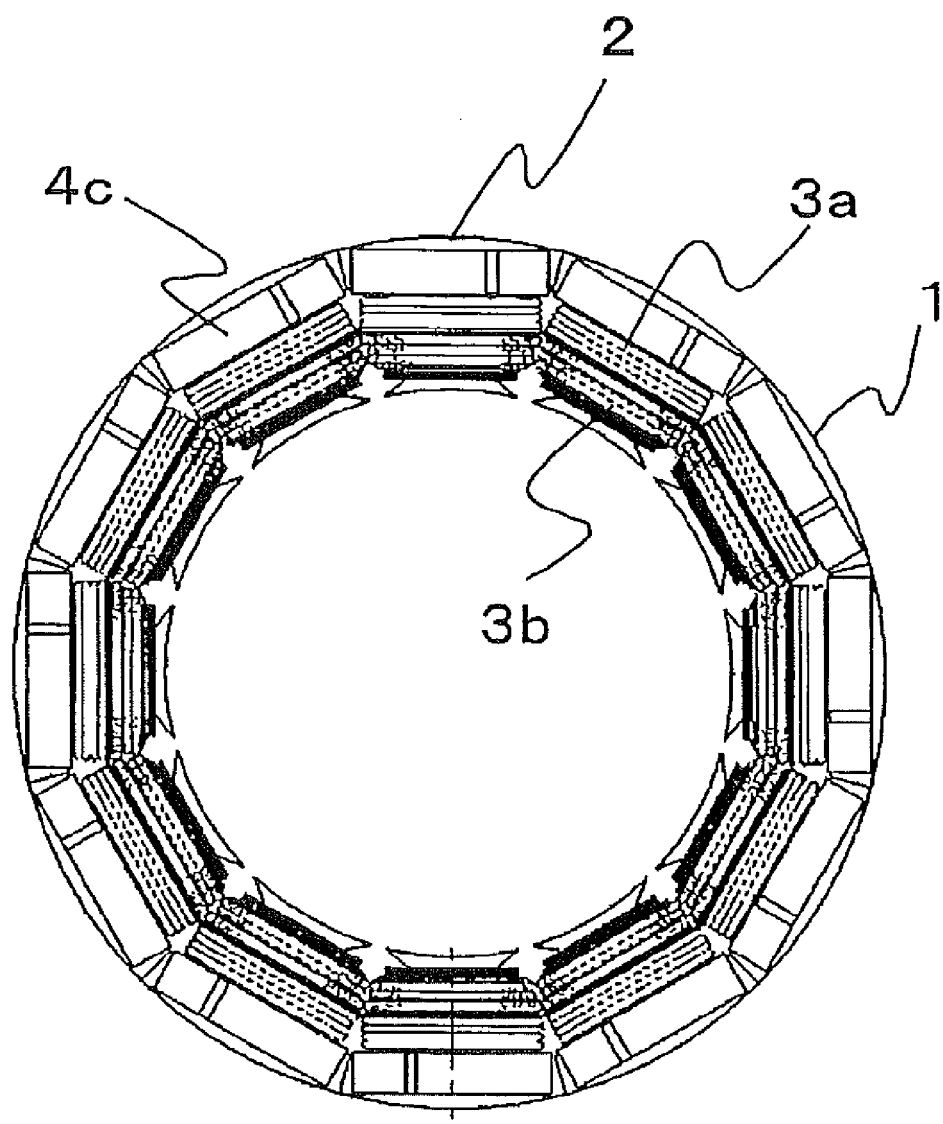
FIGS. 1A and 1B are external views of an armature of Embodiment 1 according to the present invention.
Figure 1B:
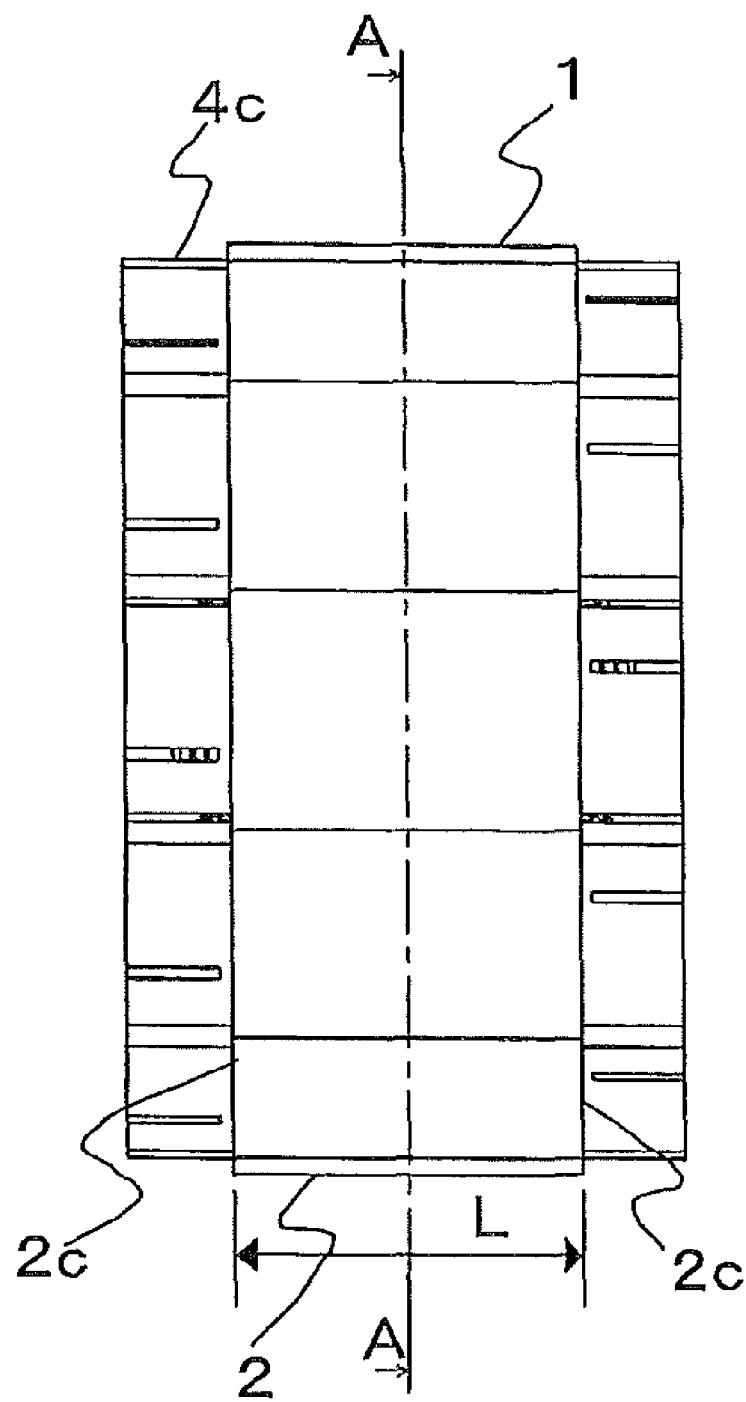
Figure 2:
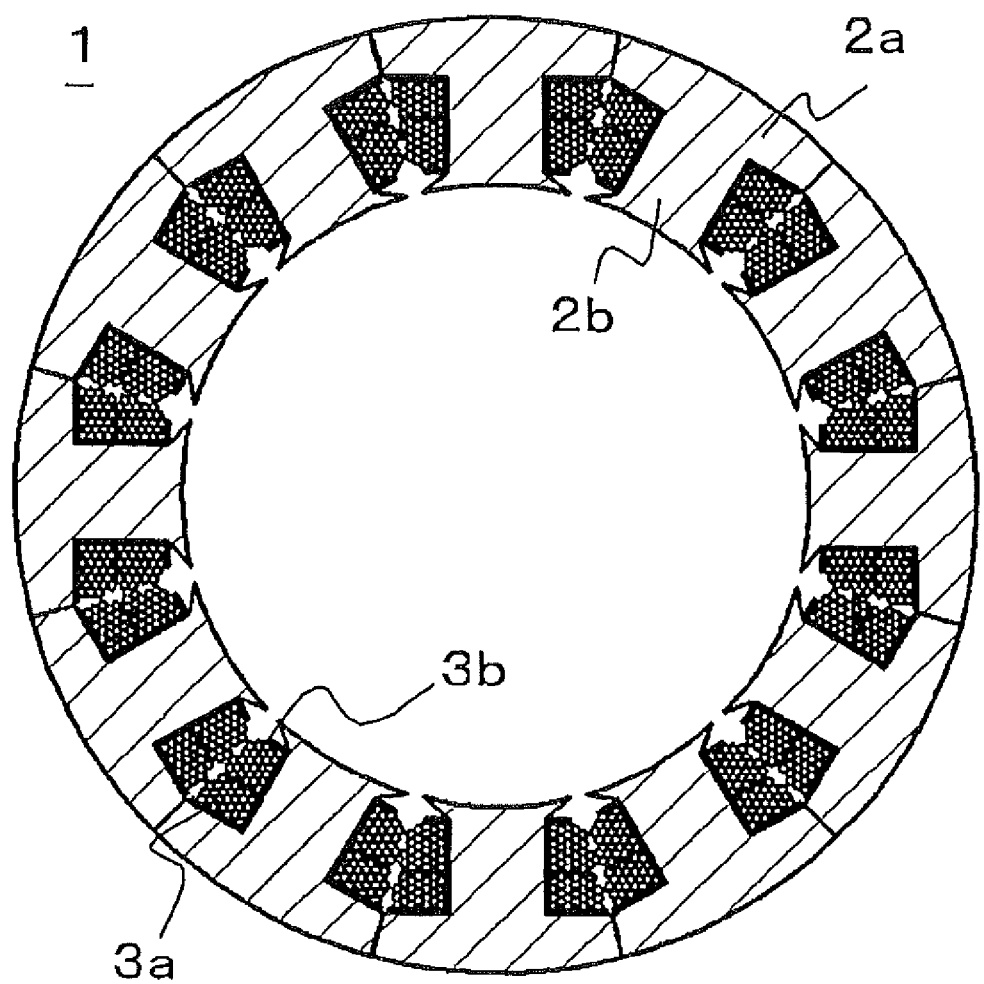
FIG. 2 is a cross-sectional view of the armature of Embodiment 1 according to the present invention, taken on line A-A in FIG. 1B.
Figure 3:
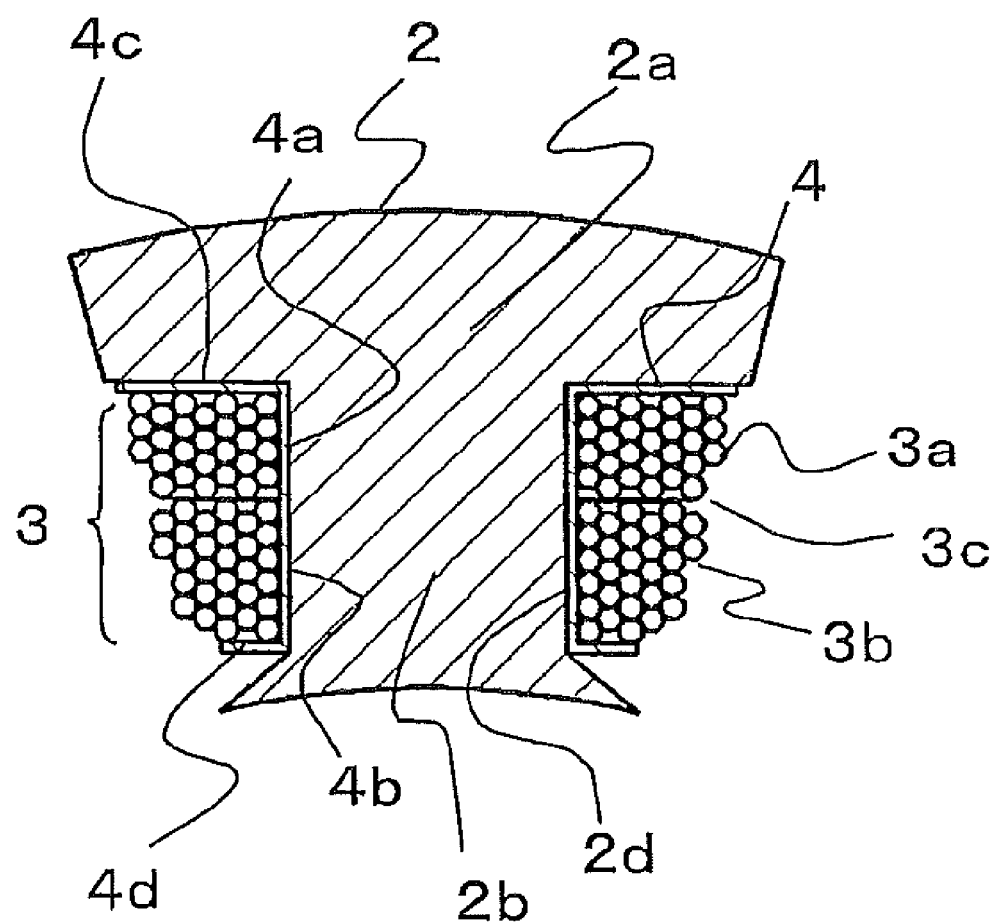
FIG. 3 is a cross-sectional view of an armature element included in the armature of Embodiment 1 according to the present invention.

FIGS. 1 through 10 illustrate structures of an armature and its armature element of Embodiment 1 according to the present invention, that are applied to a stator of a rotating electric machine having an inner rotor. FIG. 1A is an external view of an armature 1, taken projected in the rotation axis direction of a rotor (not shown in the figure); FIG. 1B is another external view of the armature, taken projected perpendicularly to the rotation axis direction; FIG. 2 is a cross-sectional view of the armature, taken on line A-A in FIG. 1B. The armature 1 is configured by circumferentially combining armature element cores 2 around which coils are wound; and FIG. 3 illustrates detail configuration of an armature element of the armature 1.

The armature element core 2 includes, as shown in its A-A section, a yoke 2a with its outer circumference shaped in an arc and a tooth 2b projecting inwardly from the yoke 2a (refer to FIG. 3) and has a core length L (refer to FIG. 1B). A coil winding 3 is formed by winding wires over end faces 2c (refer to FIG. 1B) spaced apart in a core length direction and side faces 2d (refer to FIG. 3) of a tooth 2b, and includes two parts that are a first coil 3a (radially outer side) and a second coil 3b (radially inner side) and that abut each other on the side faces 2d of the tooth 2b. Between the coil winding 3 and the armature element core 2 provided is an insulator 4 that electrically insulates therebetween; that is, a first insulators 4a provided between the first coil 3a and the armature element core 2, a second insulator 4b provided between the second coil 3b and the armature element core 2, an outer insulator 4c provided on a radially outer side of the first coil 3a, and an inner insulator 4d provided on a radially inner side of the second coil 3b.

Figure 4:
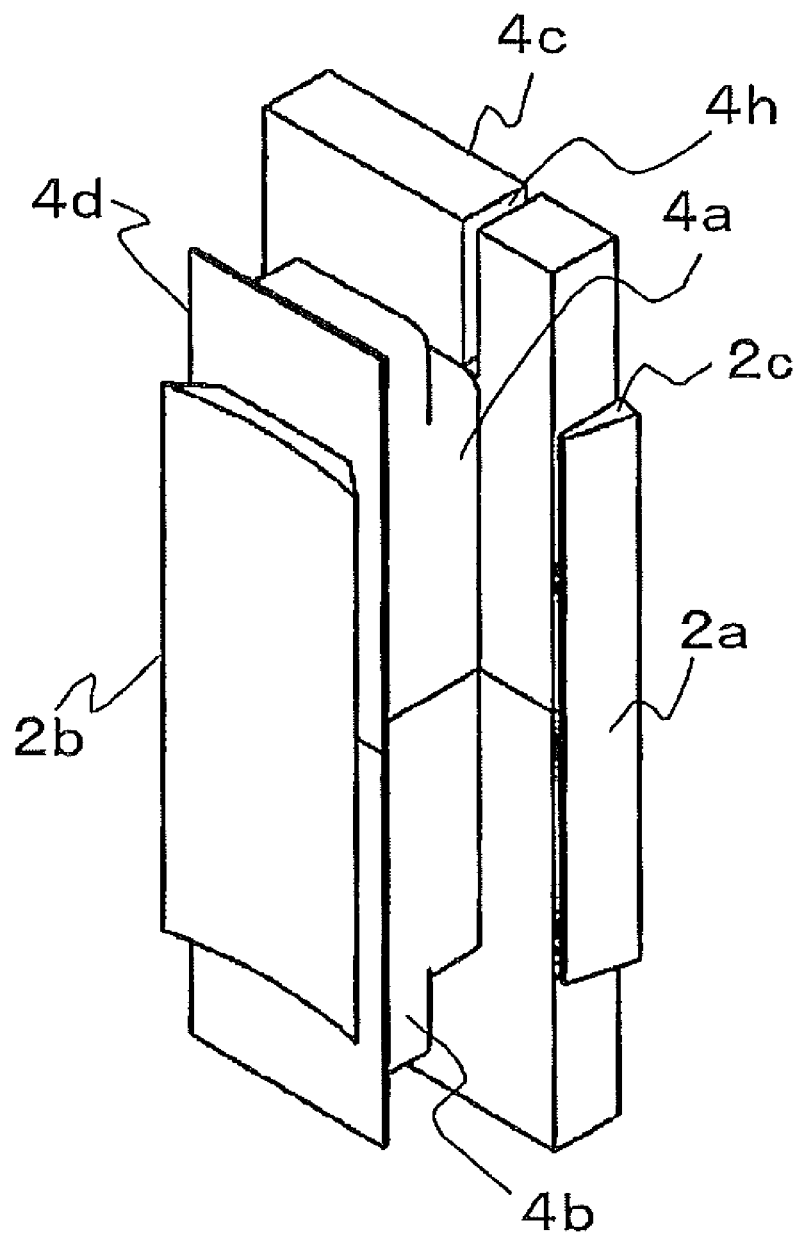
FIG. 4 is an external view of the armature element core that is explained in Embodiment 1 according to the present invention and whose windings have not been wound.
Figure 5:
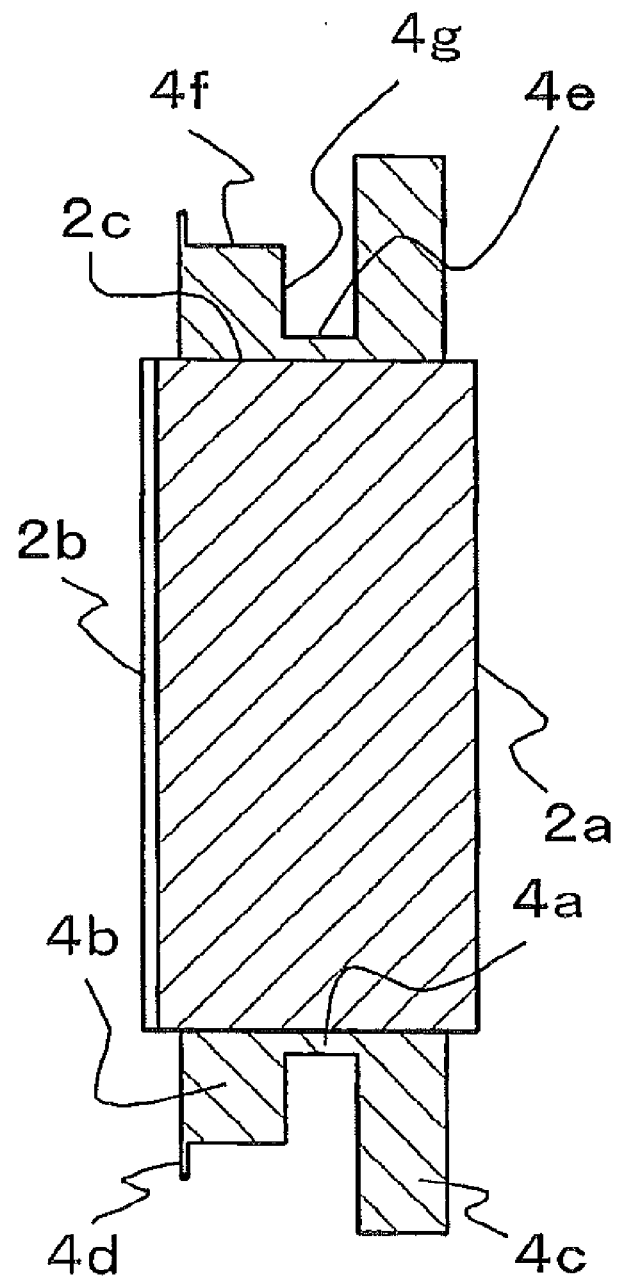
FIG. 5 is a cross-sectional view of the armature element, taken along the core length direction, that is explained in Embodiment 1 according to the present invention and whose windings have not been wound.
Figure 6:
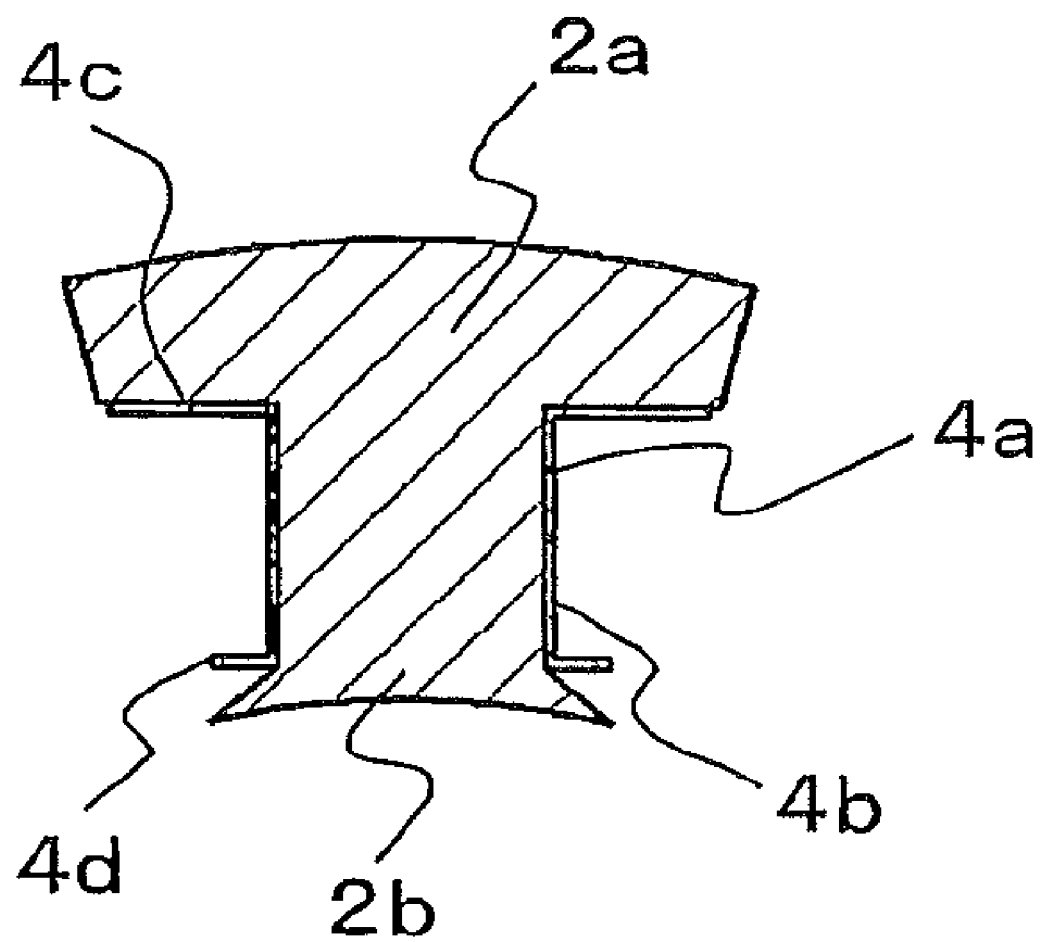
FIG. 6 is a cross-sectional view of the armature element, taken perpendicularly to the core length direction, that is explained in Embodiment 1 according to the present invention and whose windings have not been wound.

FIG. 4 is a perspective view of an armature element of this embodiment whose windings have not been wound; FIG. 5 is a cross-sectional view of that armature element, taken along the core length direction, and FIG. 6 is a cross-sectional view of that armature element, taken perpendicularly to the core length direction. In this embodiment, on each of the end faces 2c spaced apart in a core length (L) direction of the armature element core 2, an end structure member is provided, which comprises the first insulator 4a, the second insulator 4b, the outer insulator 4c and the inner insulator 4d. As shown in FIG. 5, in an end portion, the second insulator 4b is thicker than the first insulator 4a so that a face 4f (second-winding face) of the second insulator 4b, over which to wind the second coil 3b, is positioned farther from the end face 2c than a face 4e (first-winding face) of the first insulator 4a, over which to wind the first coil 3a, so as to form a riser 4g between the first-winding face and the second winding face.

Figure 7:
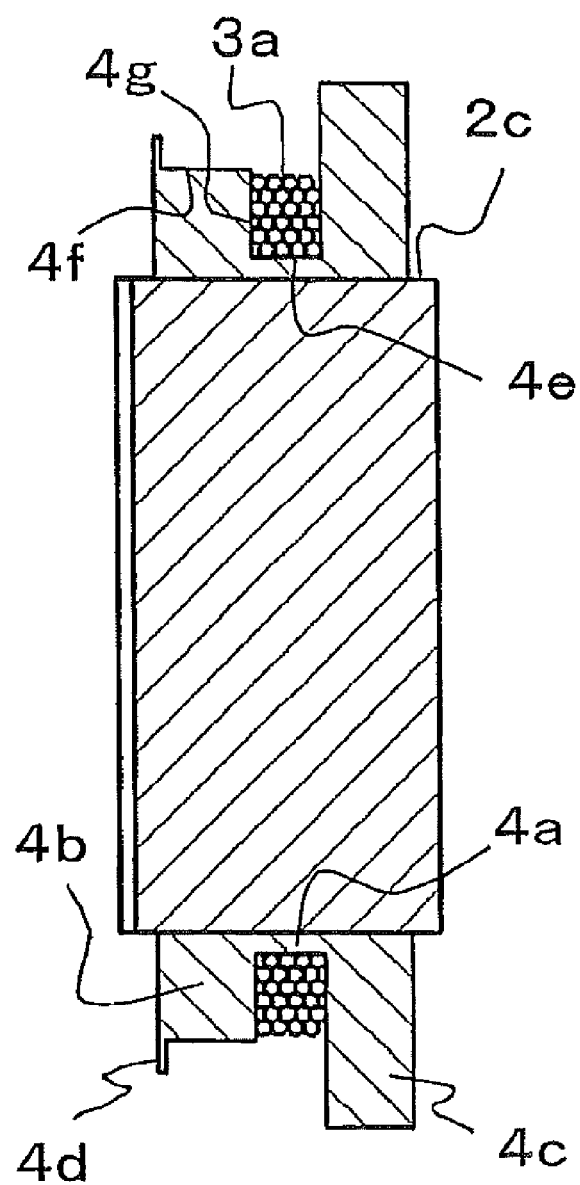
FIG. 7 is a cross-sectional view of the armature element, taken along the core length direction, that is explained in Embodiment 1 according to the present invention and has been provided only with the first coil.
Figure 8:
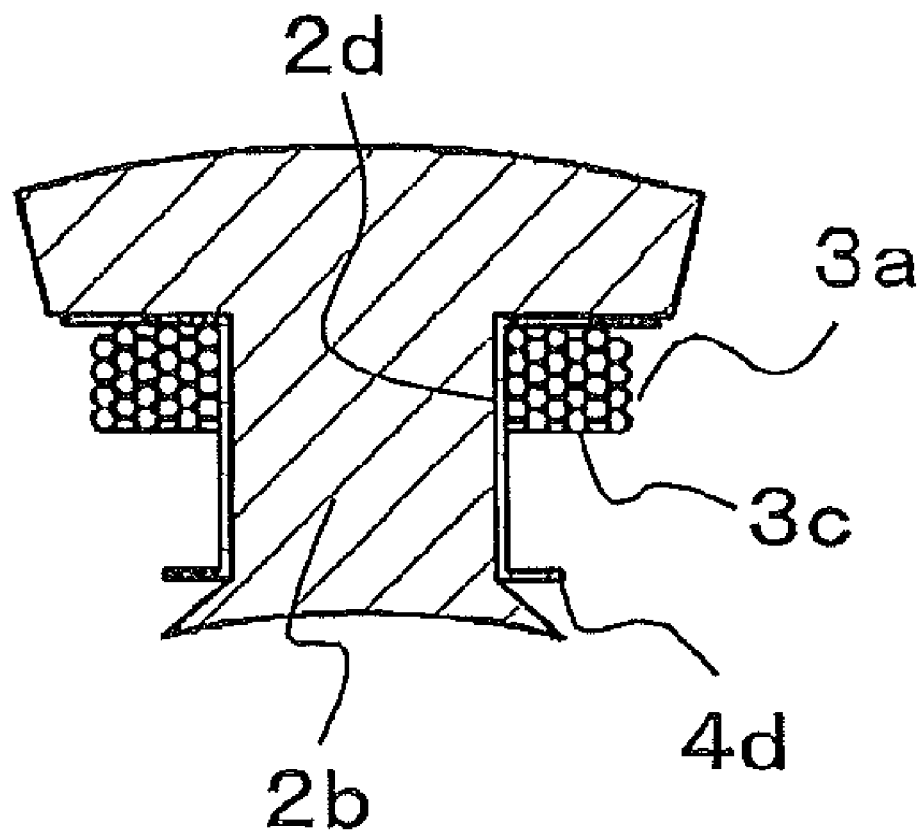
FIG. 8 is a cross-sectional view of the armature element, taken perpendicularly to the core length direction, that is explained in Embodiment 1 according to the present invention and has been provided only with a first coil.

FIG. 7 and FIG. 8 are a cross-sectional view, taken in the core length direction, of the armature element after the first coil 3a is formed, and a cross-sectional view, taken perpendicularly to the core length direction, of the armature element core, respectively. A groove 4h (refer to FIG. 4) is a passage for placing lead wires of the coil winding 3 so that coil wires are introduced toward the first insulator 4a through the groove 4h formed in the outer insulator 4c. As shown in FIG. 7, the first coil 3a is wound sequentially from the innermost layer in a neatly aligned manner in a concave portion formed between the outer insulator 4c and the riser 4g; because the wire of the first coil is wound, being tensioned, according to the riser 4g formed in the end structure member, a boundary plane 3c between the first coil and the second coil 3b can be arranged, as shown in FIG. 8, at a predetermined position even on the side faces 2d of the tooth 2b. Then, the second coil 3b can be wound sequentially from the innermost layer in a neatly aligned manner in a concave portion formed between the boundary plane 3c and the inner insulator 4d.

According to the armature element in the armature 1 of the embodiment described above, in a vicinity of the riser of the end structure member, the second-winding face 4f is positioned farther from the end face 2c of the armature element core 2 than the first-winding face 4e, so as to form the riser 4g between the first-winding face 4e and the second-winding face 4f. The first coil 3a is wound initially and it is wound contiguously to the riser; therefore, even when an automatic winding machine controls the nozzle tip position with a little less accuracy, the boundary plane 3c of the first coil 3a can be arranged, at the end portions of the armature element core of the armature 1, according to the riser 4g at a predetermined position.

As wire is wound being tensioned, a boundary plane 3c of the first coil 3a wound over the side face 2d of the armature element core 2 can also be arranged at a predetermined position according to the riser. The second coil 3b is wound along the boundary plane 3c of the first coil 3a wound over the side faces, so that a boundary plane of the second coil 3b bordering on the first coil 3a can be formed at a predetermined position, enabling the second coil to be wound in a neatly aligned manner.

According to the above-mentioned manner, wires of both the first coil 3a and the second coil 3b can be wound in a neatly aligned manner as designed, realizing a high density coil.

Figure 9:
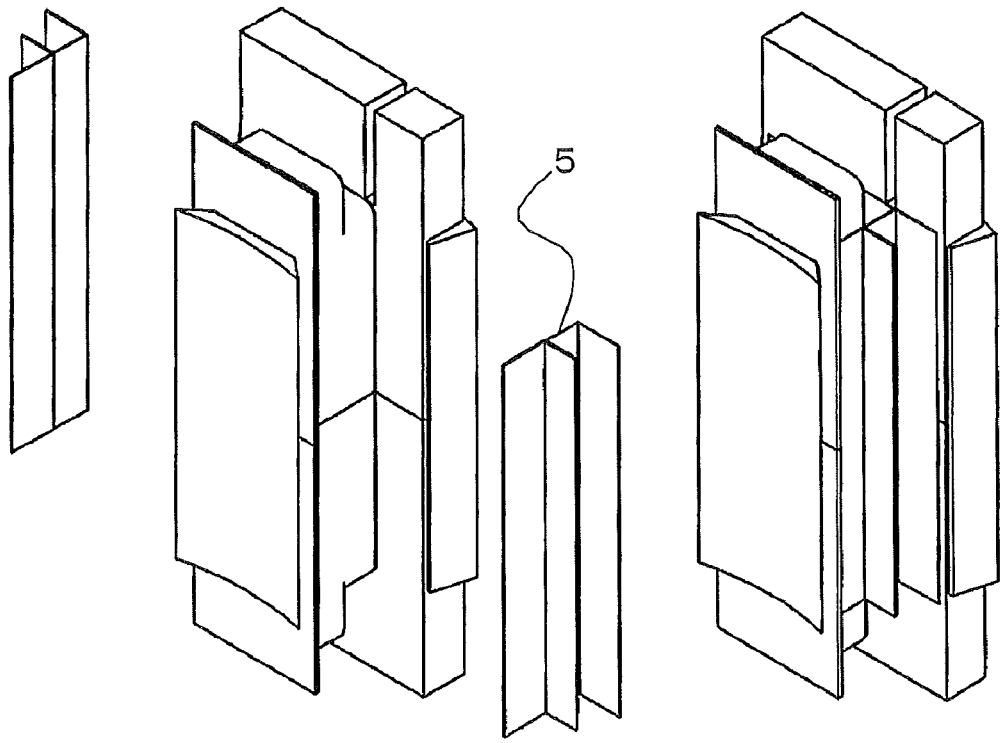
FIG. 9 illustrates how films are provided on the armature element core of Embodiment 1 according to the present invention.
Figure 10:
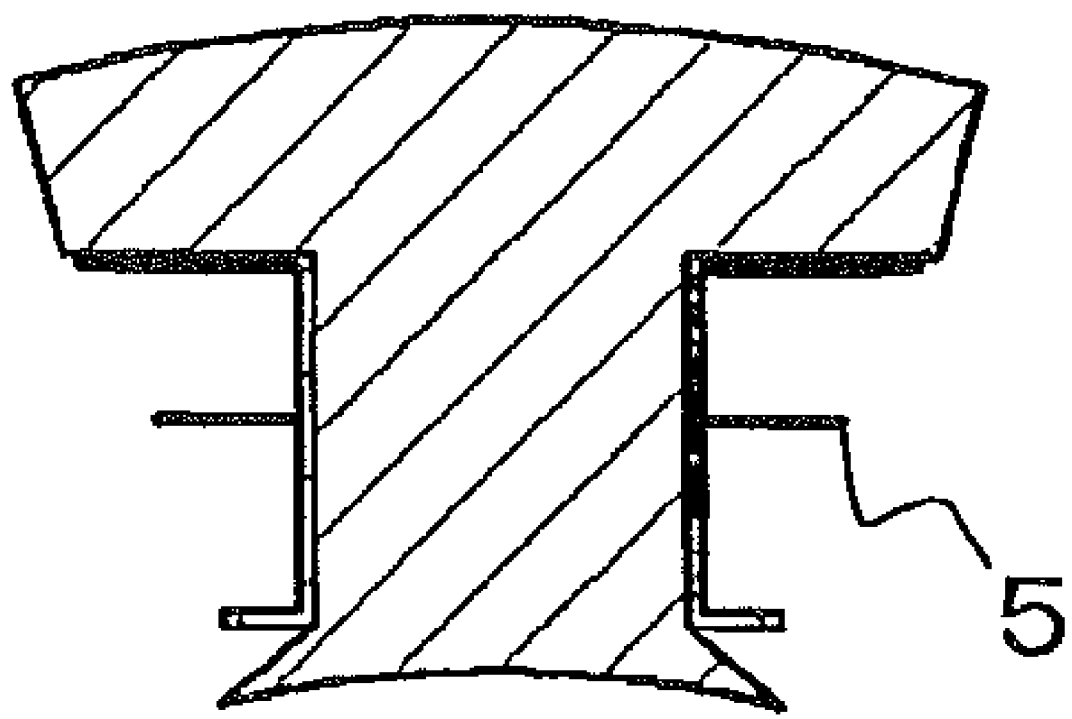
FIG. 10 also illustrates how films are provided on the armature element of Embodiment 1 according to the present invention.

Furthermore, as illustrated in FIGS. 9 and 10, films 5 may be interposed between the first coil 3a and the second coil 3b, and between the coil winding 3 and the insulator 4. This further enhances insulation capability between the first coil 3a and the second coil 3b and that between the coil winding 3 and the armature element core.

Embodiment 2

Figure 11:
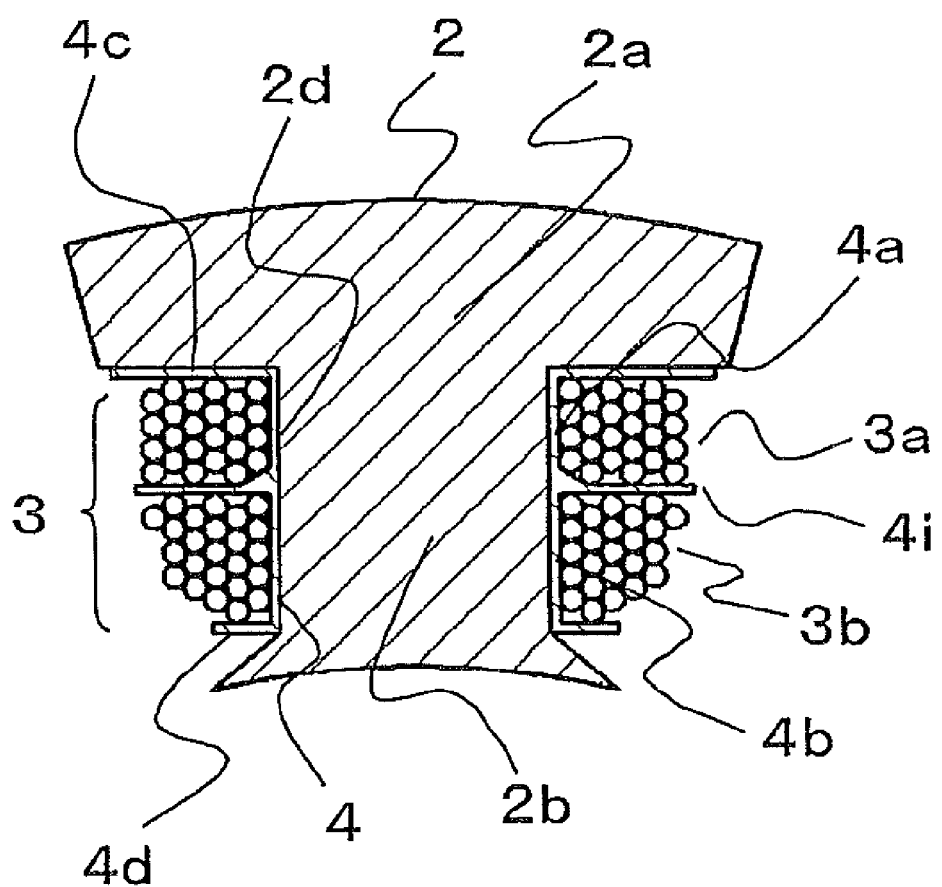
FIG. 11 is a cross-sectional view of an armature element, taken perpendicularly to a core length direction, of Embodiment 2 according to the present invention.
Figure 12:
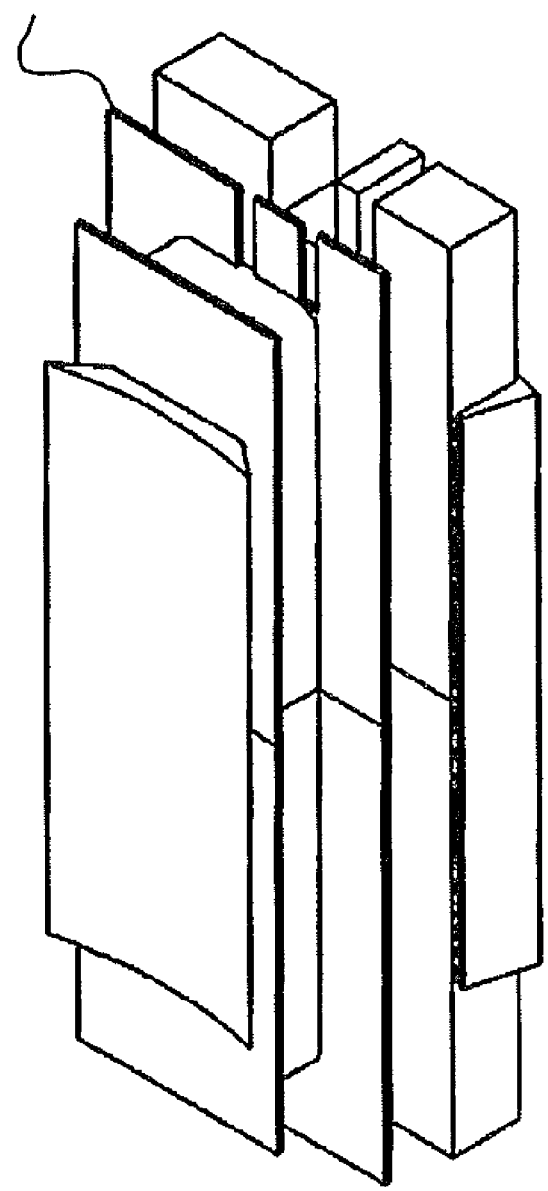
FIG. 12 is an external view of the armature element that is explained in Embodiment 2 according to the present invention and whose windings have not been wound.
Figure 13:
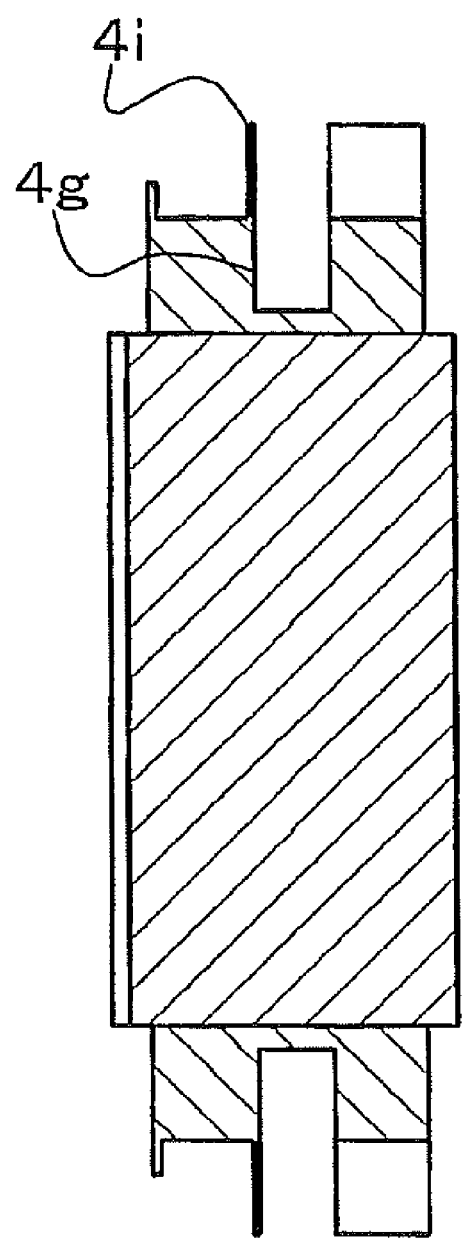
FIG. 13 is a cross-sectional view of the armature element, taken along the core length direction, that is explained in Embodiment 2 according to the present invention and whose windings have not been wound.
Figure 14:
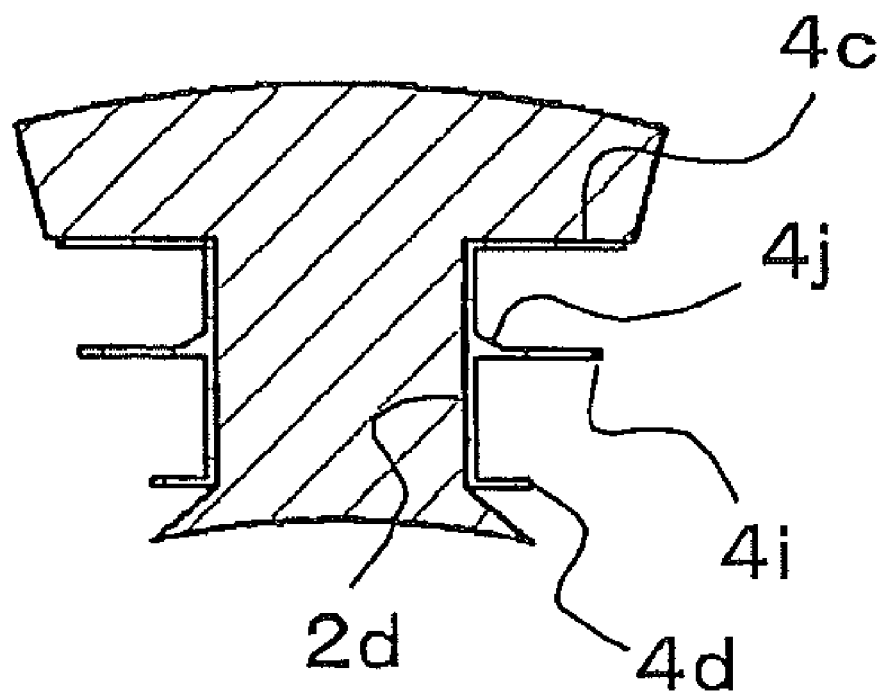
FIG. 14 is a cross-sectional view of the armature element, taken perpendicularly to the core length direction, that is explained in Embodiment 2 according to the present invention and whose windings have not been wound.
Figure 15:
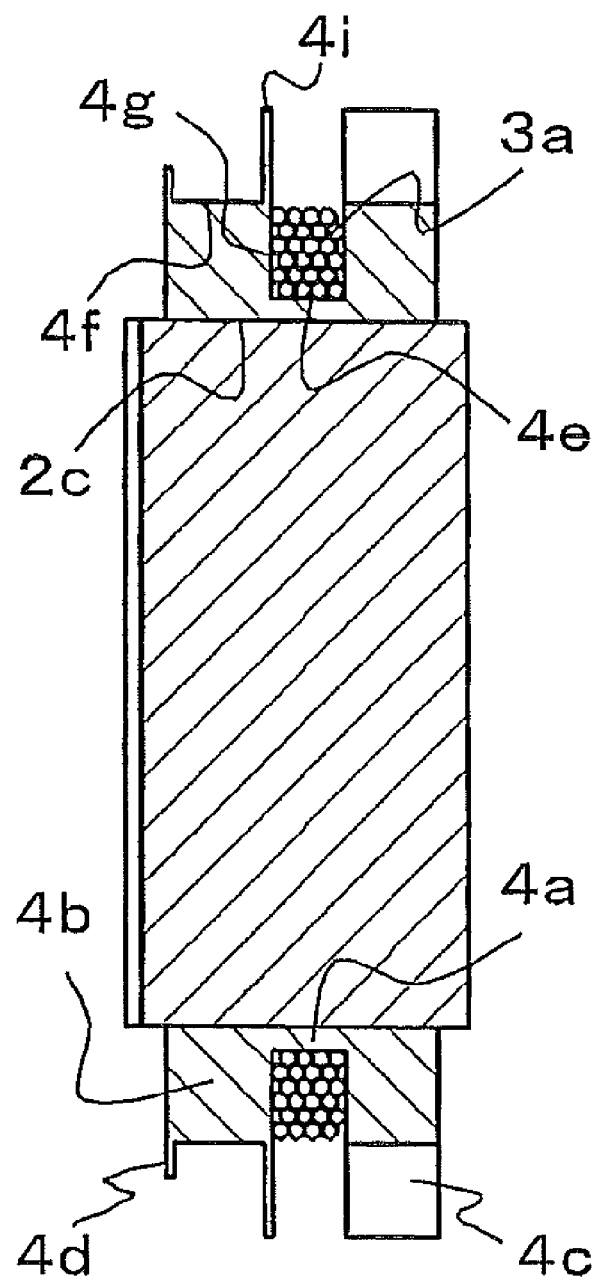
FIG. 15 is a cross-sectional view of the armature element, taken along the core length direction, that is explained in Embodiment 2 according to the present invention and has been provided only with a first coil.

FIG. 11 is a cross-sectional view of an armature element in an armature 1 of Embodiment 2, taken perpendicularly to a core length direction; FIG. 12 is a perspective view of the armature element in this embodiment whose windings have not been wound; FIG. 13 is a cross-sectional view of the armature element shown in FIG. 12, taken along the core length direction; and FIG. 14 is a cross-sectional view of the armature element shown in FIG. 12, taken perpendicularly to the core length direction. This embodiment differs from Embodiment 1 only in that a partition is further provided between the first coil 3a and the second coil 3b in such a manner that the partition extends from the riser 4g of the end structure member. Since other components are the same as those in Embodiment 1, the explanations thereof will be omitted.

According to the armature element in the armature 1 of this embodiment, in a vicinity of the riser of the end structure member, the second-winding face 4f is positioned farther from the end face 2c of the armature element core 2 than the first-winding face 4e, so as to form the riser 4g between the first-winding face 4e and the second-winding face 4f; therefore, at least in the end portions, the first coil 3a wound initially can be wound contiguously to the riser 4g in a neatly aligned manner.

Furthermore, on the side face 2d of the armature element core 2, a partition 4i is provided between the first coil 3a and the second coil 3b in such a manner that the partition extends from the riser 4g. Therefore, even when winding the wire of the first coil 3a with insufficient tension causes failing to form the boundary plane 3c at a predetermined position on the side face 2c of the armature element core 2, the wire of the second coil 3b can be wound, in a concave portion formed between the partition 4i and the inner insulator 4d, sequentially from the innermost layer in a neatly aligned manner, which gives an advantage in that high density winding is realized.

Figure 16A:
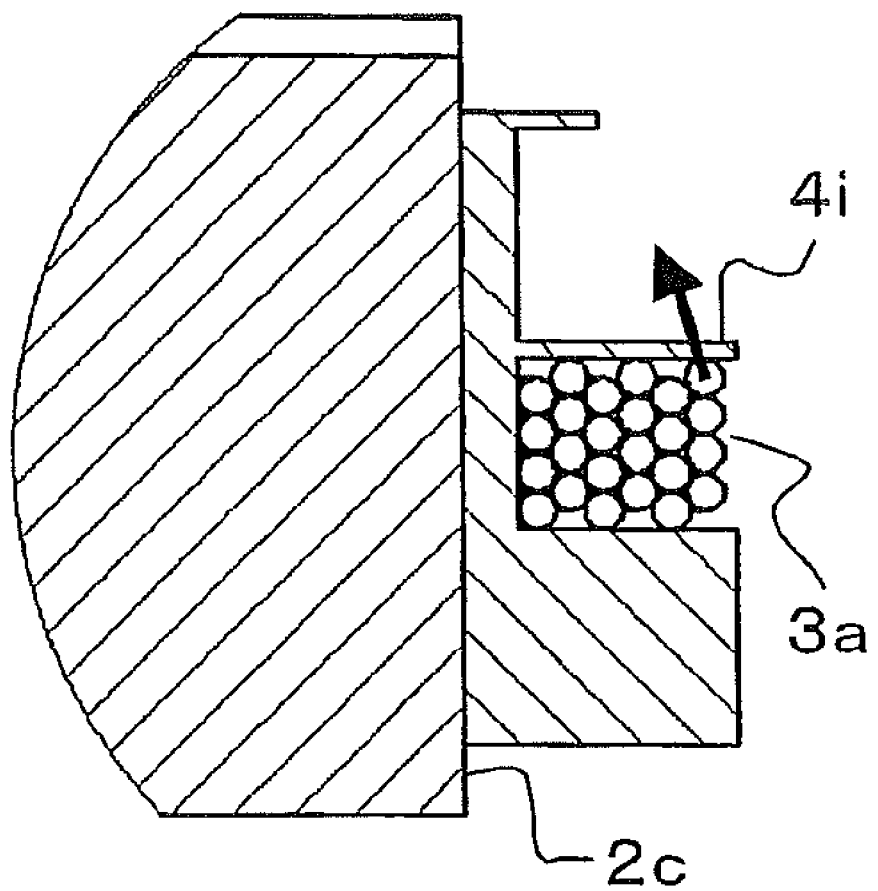
FIG. 16 illustrate force applied to a partition of the armature element of Embodiment 2 according to the present invention.
Figure 16B:
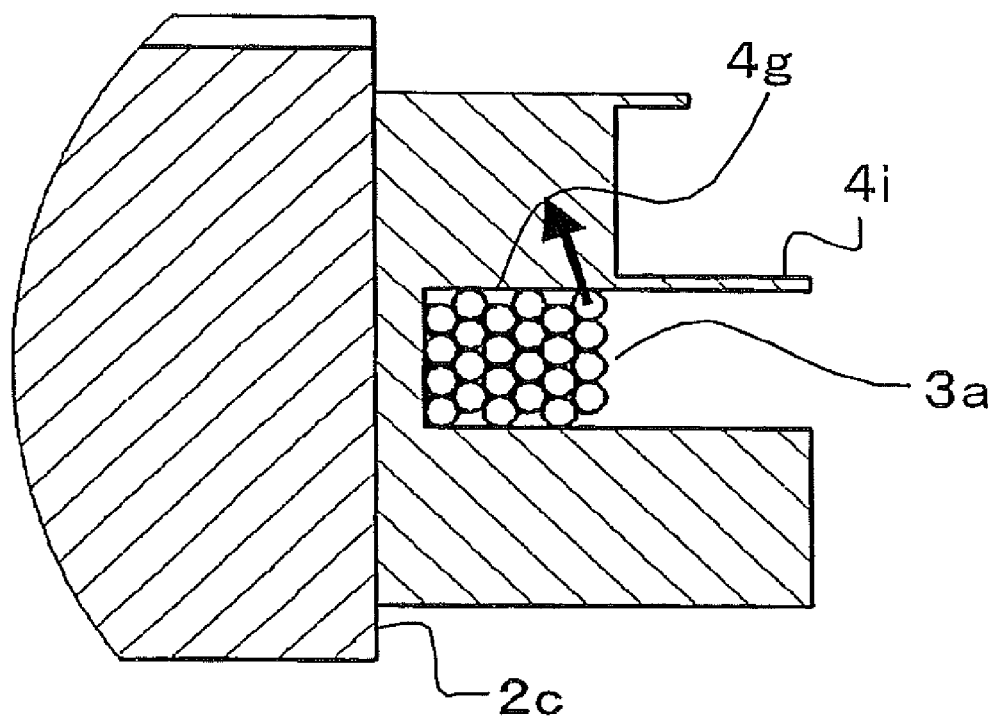

When winding a wire in a neatly aligned manner, each upper winding is positioned on the trough created between lower adjacent windings; therefore, a tension applied to the wire during winding operation produces a force that thrusts an upper winding into an interval between lower adjacent windings so as to widen the interval. In a case when providing only the partition 4i without such an end structure member described in this embodiment, the force acts, after forming the first coil 3a, only on the partition 4i as shown in FIG. 16A to bend and deform the partition 4i formed in a thin wall, which has sometimes caused difficulty in winding a wire in a neatly aligned manner. However, in this embodiment, the riser 4g formed in the end structure member can, as shown in FIG. 16B, withstand the force acting on the partition 4i, which gives an advantage in that a wire can be accurately wound without deformation of the partition 4i in a neatly aligned manner.

In order that a wire is wound in a neatly aligned manner with each upper winding being positioned on the trough created between lower adjacent windings, dimensions of gaps— in the respective concaved portions—between the outer insulator 4c and the partition 4i and between the inner insulator 4d and the partition 4i are frequently determined, taking the diameters of the wires into account so that two layers are fitted into each of the gaps. As shown in FIG. 11, if a first turn in the innermost layer is wound being in contact with the outer insulator 4c, a dead space is inevitably created between the end turn in the innermost layer and the partition 4i. When a rounded juncture portion 4j is provided along the foot of the partition 4i so as to fill the dead space with itself (refer to FIG. 14), the partition 4i can be made stouter so as to be prevented from deformation, which also allows the partition 4i to be thinner, realizing a higher density coil.

Figure 17:
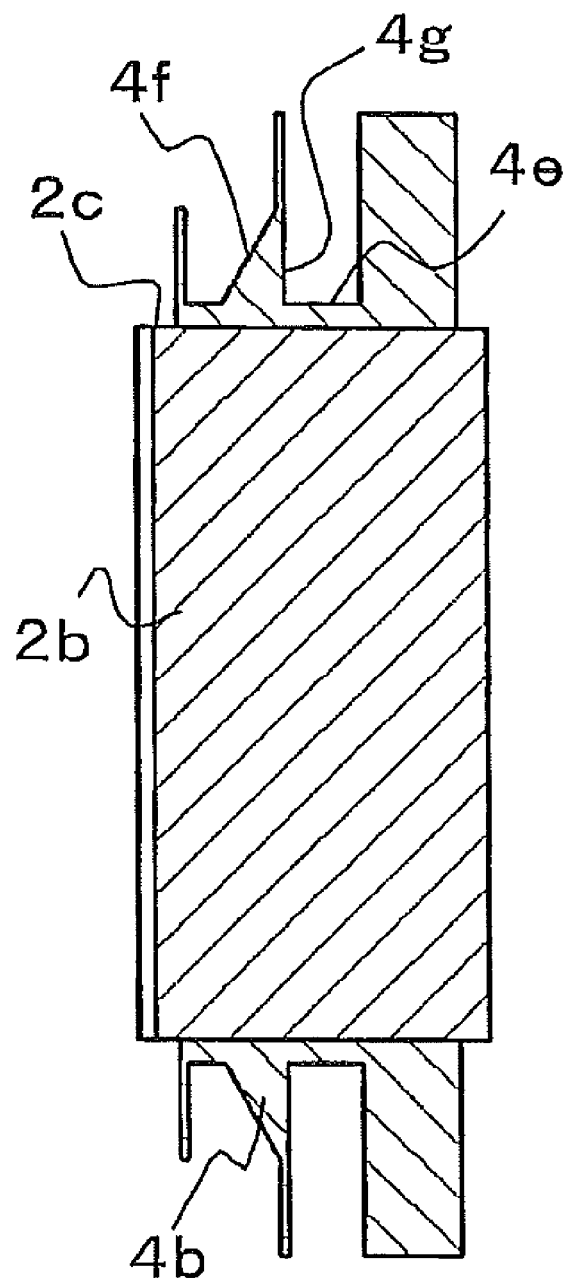
FIG. 17 is a cross-sectional view of another armature element, taken along a core length direction, that is explained in Embodiment 2 according to the present invention and whose windings have not been wound.

The riser 4g of the end structure member can also be formed, as shown in FIG. 17, in a manner that the closer to the tip of the tooth 2b, portions of the second insulator 4b are positioned, the thinner the portions are made the farther from the riser, portions of the second-winding face 4f are positioned, the closer to the end face 2c of the armature element core 2 the portions are positioned. Even when forming an end structure member in that manner, a riser 4g is formed so as to realize a high density coil similar to that described above. Furthermore, this can also shorten the wire length of the second coil 3b in comparison to that shown in FIG. 13 so as to reduce coil resistance, which reduces copper losses to advantageously realize a high efficiency armature 1.

Embodiment 3

Figure 18:
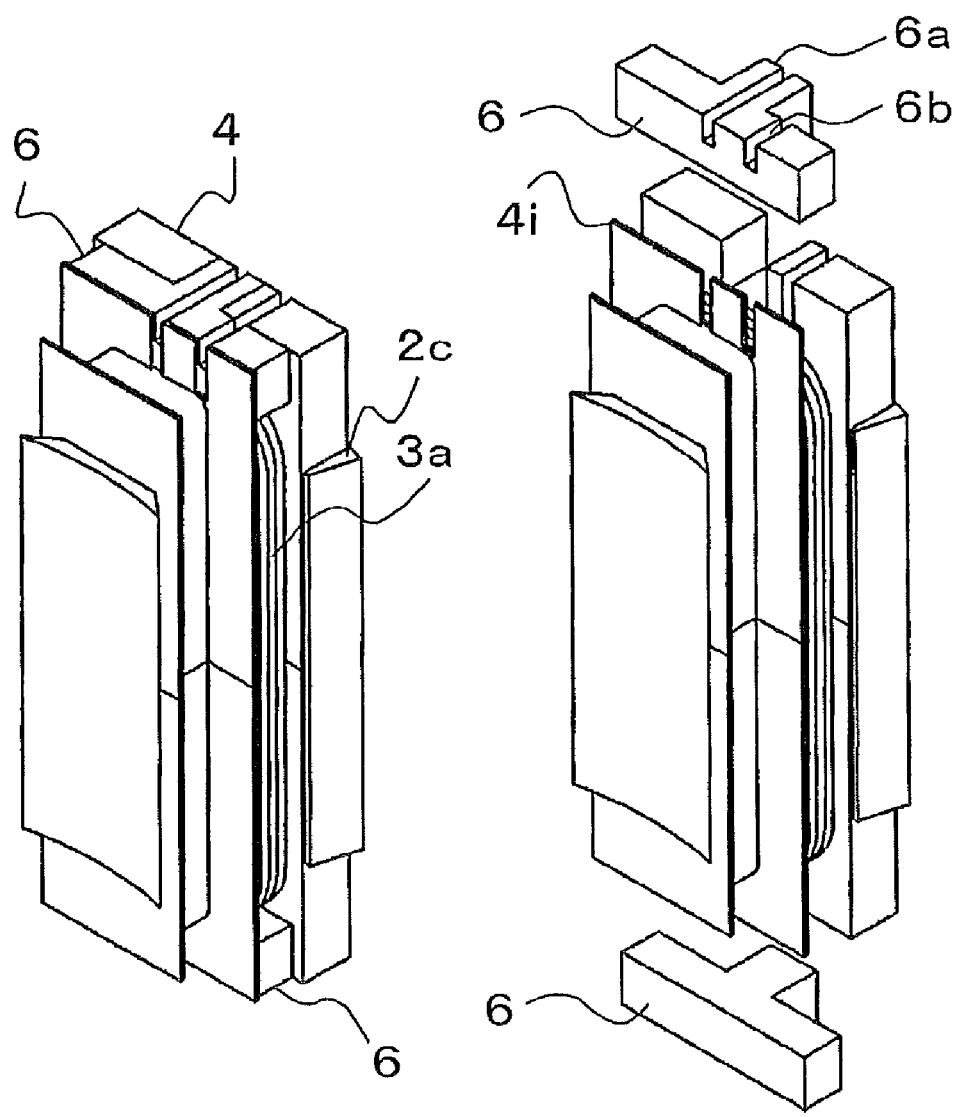
FIG. 18 is an external view of an armature element of Embodiment 3 according to the present invention.
Figure 19:
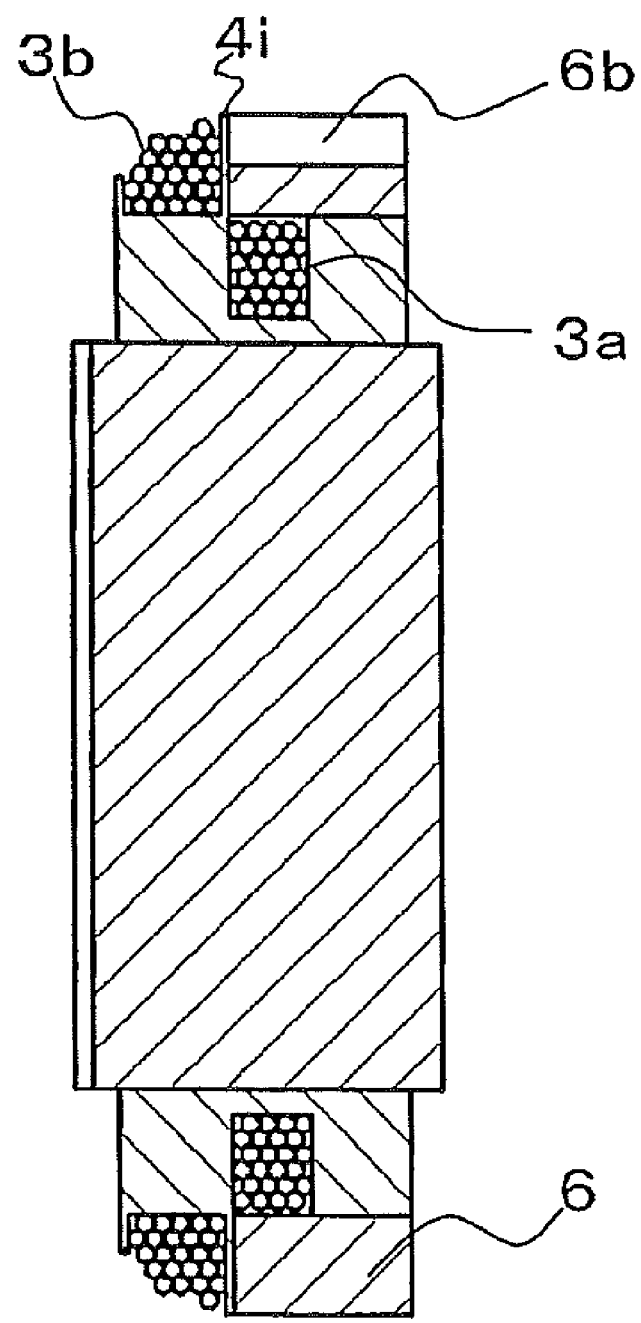
FIG. 19 is a cross-sectional view of the armature element, taken along an armature element core direction, of Embodiment 3 according to the present invention.

FIG. 18 and FIG. 19 are views that illustrate this embodiment in which blocks 6 are further provided onto end portions of the armature element of Embodiment 2, and other components are similar to those of Embodiment 2; thus, explanations of the other components will be omitted. The block 6 includes a fitting portion 6a and a block groove 6b. Before a second coil 3b is formed, the blocks 6 are each arranged, as shown in FIG. 18, on the top and bottom sides of first coil 3a at positions farther from end faces 2c of armature element core 2 than the first coil 3a so that the fitting portions 6a are fitted into predetermined positions in the end portions of the armature element of the armature 1. A lead wire for the second coil 3b is led through a block groove 6b provided in the block 6, and then pulled out through another block groove 6b after completing winding a wire.

Figure 20:
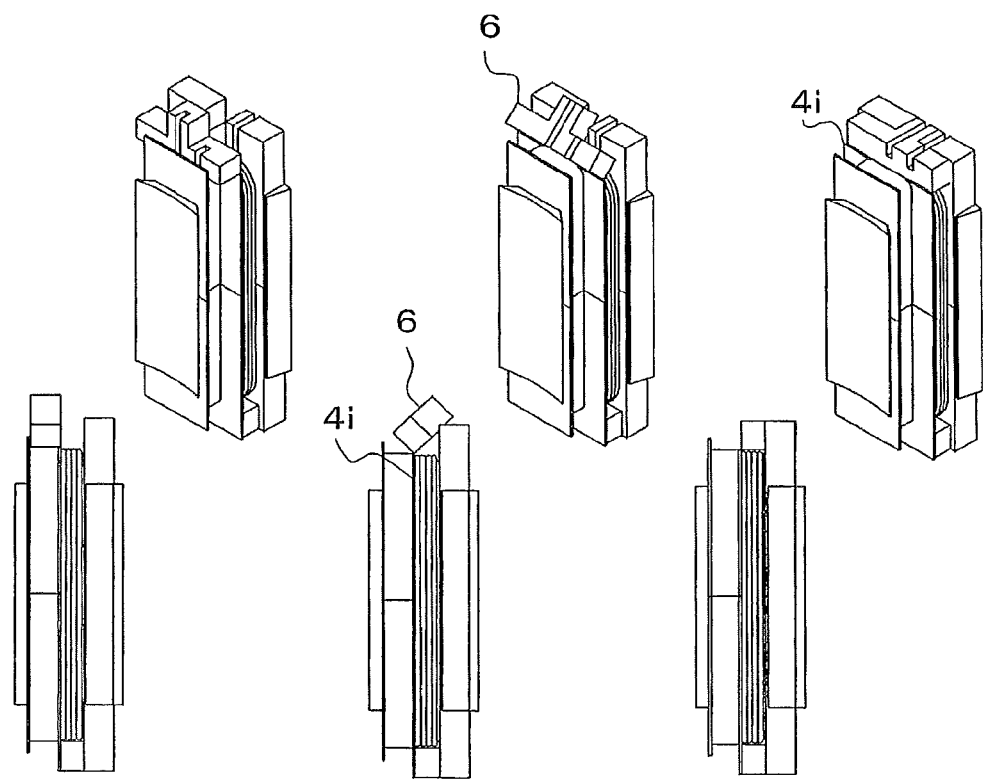
FIG. 20 includes external views of another armature element of Embodiment 3 according to the present invention and illustrates how to assemble the armature element.

The blocks 6 illustrated in FIGS. 18 and 19 are components separated from an insulator 4; however, if the block is, as shown in FIG. 20, partially joined to a thin portion of the partition 4i in advance, it is also possible to fit the fitting portion into the predetermined position by pivoting the block 6 with its pivot center being that thin portion. Such integration of the block 6 into the partition 4i can reduce the number of components and manufacturing costs.

An armature 1 according to this embodiment has the same advantages of Embodiment 2; furthermore, insertion of the blocks 6 can support the partition 4i in the end portions from the partition's rear (from a "second coil" side), which prevents the partition 4i from its deformation during forming a second coil 3b and ensures to wind a wire in a neatly aligned manner, giving an advantage of realizing a higher density coil.

Furthermore, grooves 6b for passing a lead wire of a second coil 3b are formed in the block 6 and the insulator 4; thus, even when high voltage between the coils is generated due to failures, complete separation between the first coil 3a and the second coil 3b is made by the partition 4i and the block 6, which can reduce a risk of short-circuit between the coils, enhancing reliability of the armature 1.

Embodiment 4

Figure 21:
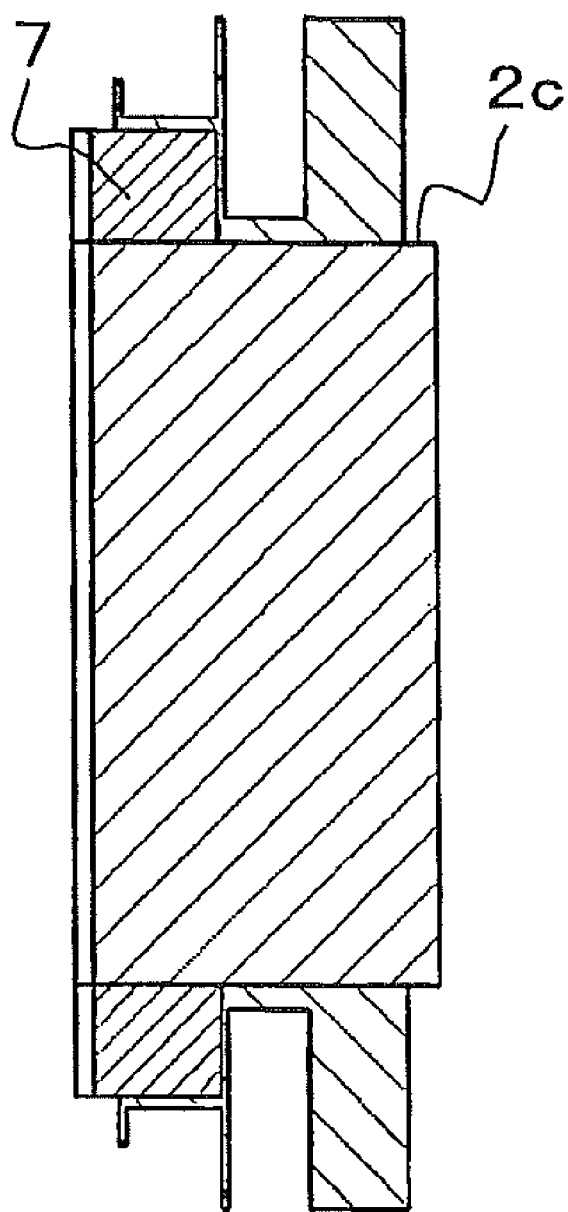
FIG. 21 is a cross-sectional view of an armature element, taken along an armature element core length direction, that is explained in Embodiment 4 according to the present invention and whose windings have not been wound.

FIG. 21 is a cross-sectional view of an armature element in an armature according to this embodiment, which features its end structure member including a portion made of magnetic material. In general, a leakage magnetic field is generated from the end face 2c; then, this leakage flux flows into the air having a high reluctance, and the leakage magnetic field causes a problem in which the field acts, similarly to such as electromagnetic noises, badly to the surrounding electric apparatuses.

In an armature element of an armature 1 according to this embodiment, an end structure member of an armature element core 2 includes a portion made of magnetic material 7, which can reduce reluctance of a passage for such a leakage flux, realizing a high efficiency armature 1; furthermore, the magnetic material 7 serves as a field clamp to limit the area of the leakage magnetic field, giving an advantage to reduce bad influences to the surrounding apparatus.

Embodiment 5

Figure 22:
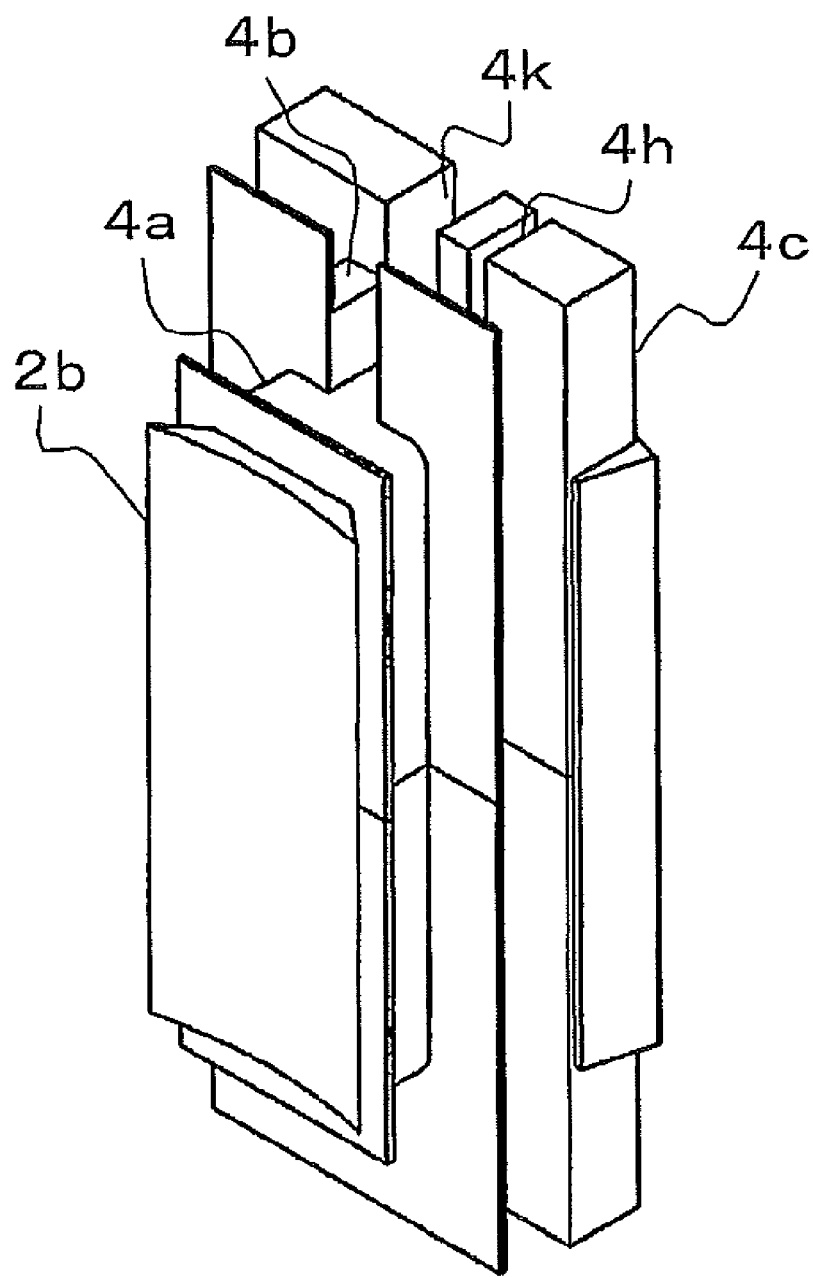
FIG. 22 is an external view of an armature element that is explained in Embodiment 5 according to the present invention and whose windings have not been wound.
Figure 23:
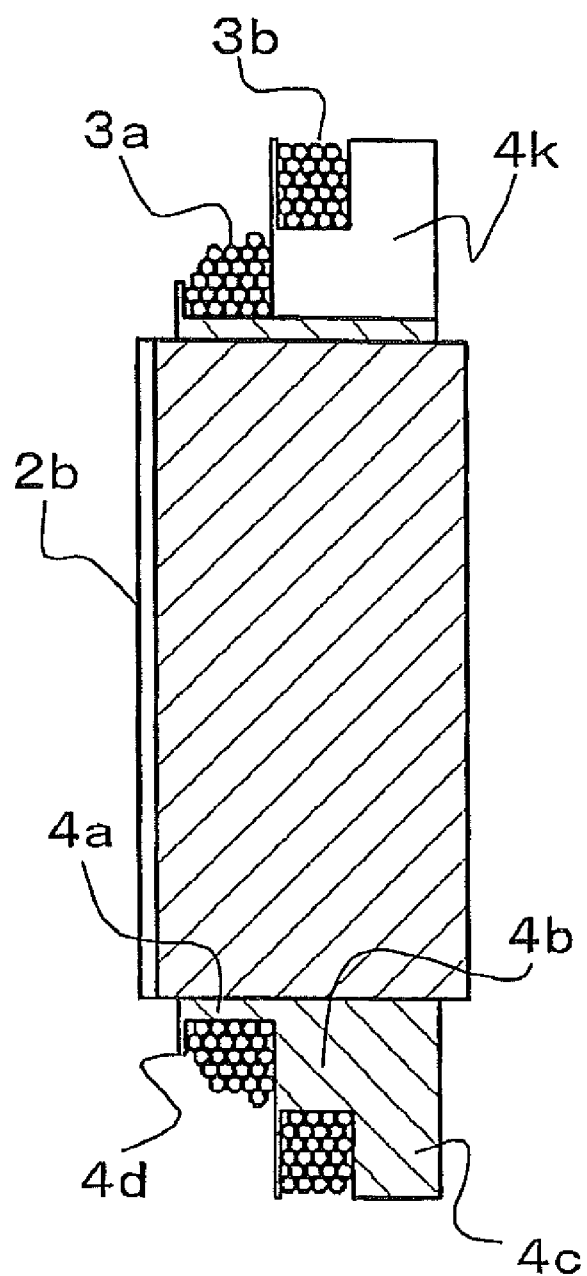
FIG. 23 is a cross-sectional view of the armature element, taken along an armature element core direction, of Embodiment 5 according to the present invention.

FIG. 22 is a perspective view of an armature element of this embodiment whose windings have not been wound; FIG. 23 is a cross-sectional view, taken along a core length direction, of the armature element whose windings have been wound. Although, in Embodiments 1 through 4, the first coil 3a is formed around an outer side of the tooth 2b, and the second coil 3b is formed around an inner side thereof; in this embodiment, differently, these coils are positioned in inverse relation, that is, a first coil 3a is formed around an inner side of the tooth and a second coil 3b is formed around an outer side thereof. Accordingly, a second insulator 4b provided outer side is thicker than a first insulator 4a provided inner side.

When forming coils, the first coil 3a is initially formed similarly to the foregoing embodiments; and its formation is made by using a groove 4k that is formed so as to uninterruptedly passing through an outer insulator 4c and a second insulator 4b, so that a lead wire of the first coil 3a is introduced through the groove 4k. After forming the first coil 3a, the second coil 3b is formed. Because the second coil is formed as wound over the top face of the second insulator 4b, the second coil is prevented from contacting the lead wire of the first coil introduced through the groove 4k.

As describe above, the armature element of the armature 1 according to this embodiment shows such an effect, as well as those described in Embodiment 2, that the first coil never contacts the second coil, which can make it easier to wind wires in a neatly aligned manner and enhance insulation capability as well.

In this embodiment, it is also possible to make the second insulator 4b thinner toward a base portion of the tooth 2b to provide an inclined face (refer to FIG. 17), or to form a rounded juncture portion 4j at the foot of the partition 4i (refer to FIG. 14), thereby further enjoying their corresponding effects.

Figure 24:
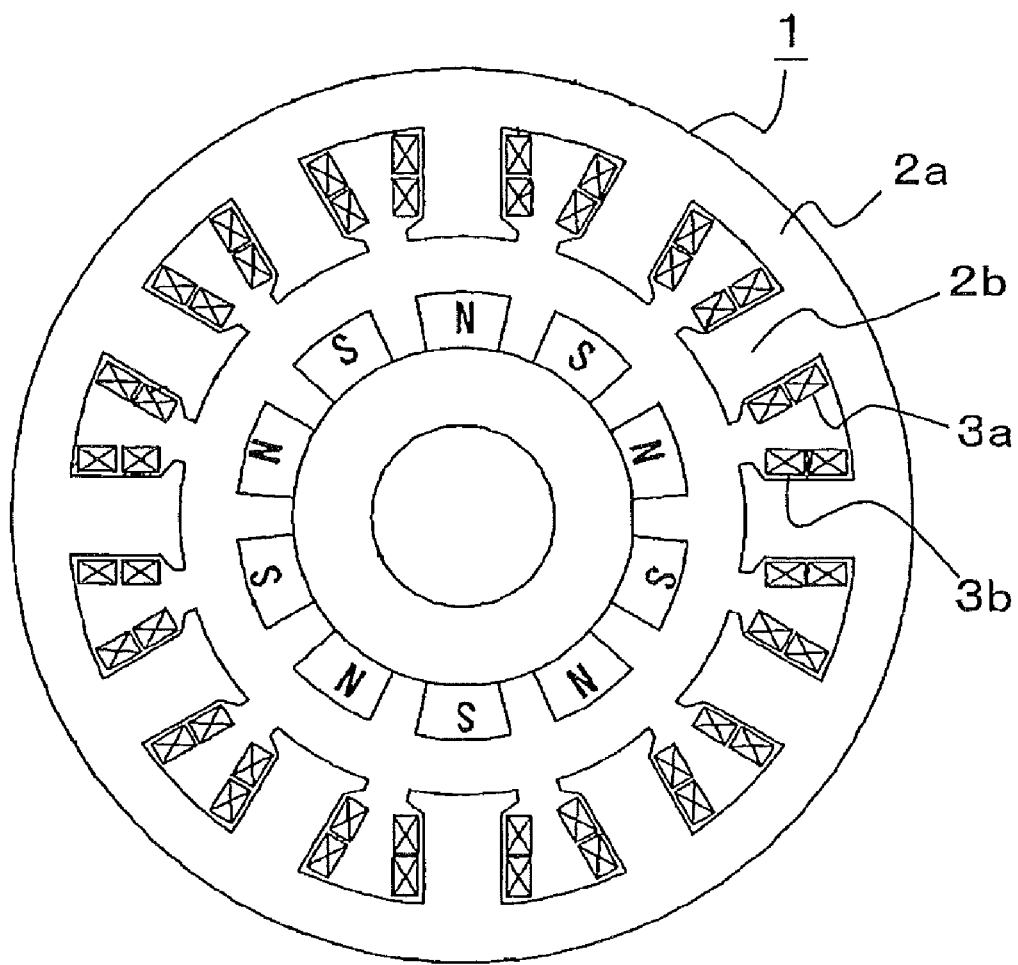
FIG. 24 is a view of an example in which an armature according to the present invention is applied to a stator in a rotating electric machine having an inner rotor.
Figure 25:
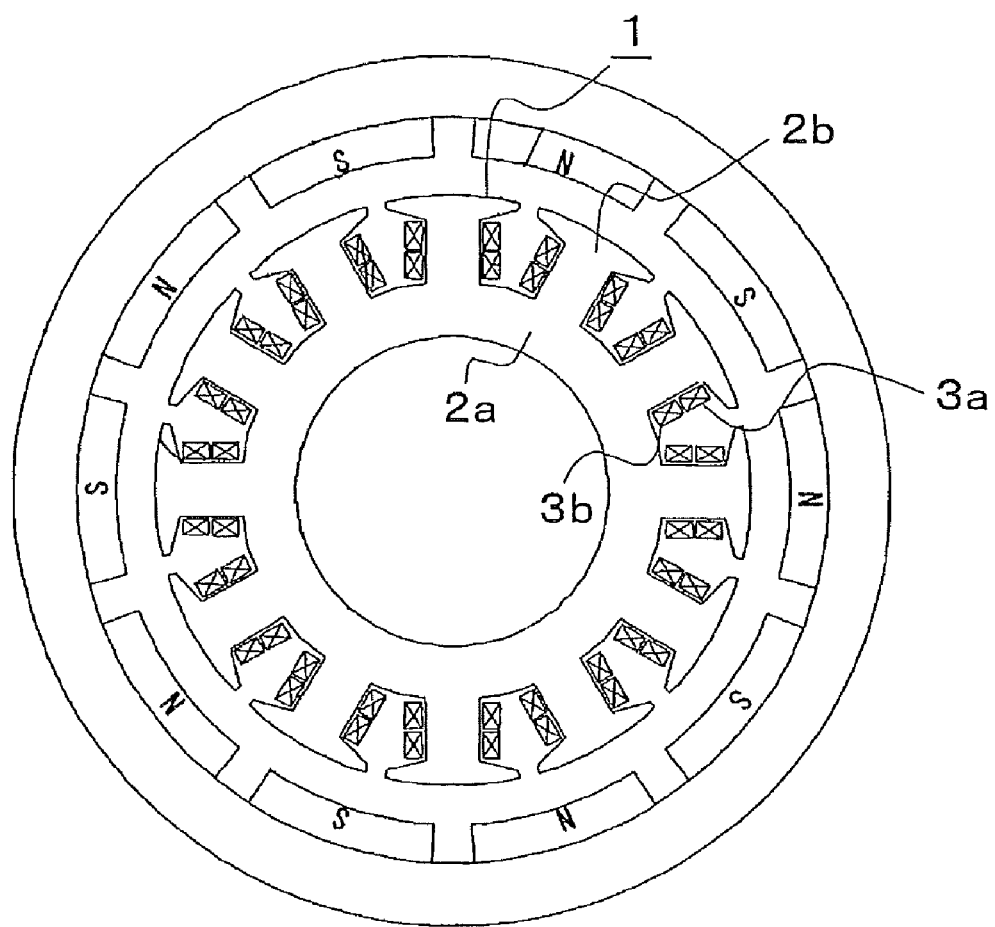
FIG. 25 is a view of an example in which an armature according to the present invention is applied to a rotor in a rotating electric machine having an outer rotor.

In the descriptions above, explanations have been made for an armature 1 according to the present invention which is to be applied to the so-called "inner-rotor stators" shown in FIG. 24; however, the armature is applicable to the so-called "outer-rotor stators" in FIG. 25. Needless to say, the armature 1 according to the present invention is also applicable to rotating electric machines regardless of motors or generators.

Figure 26:
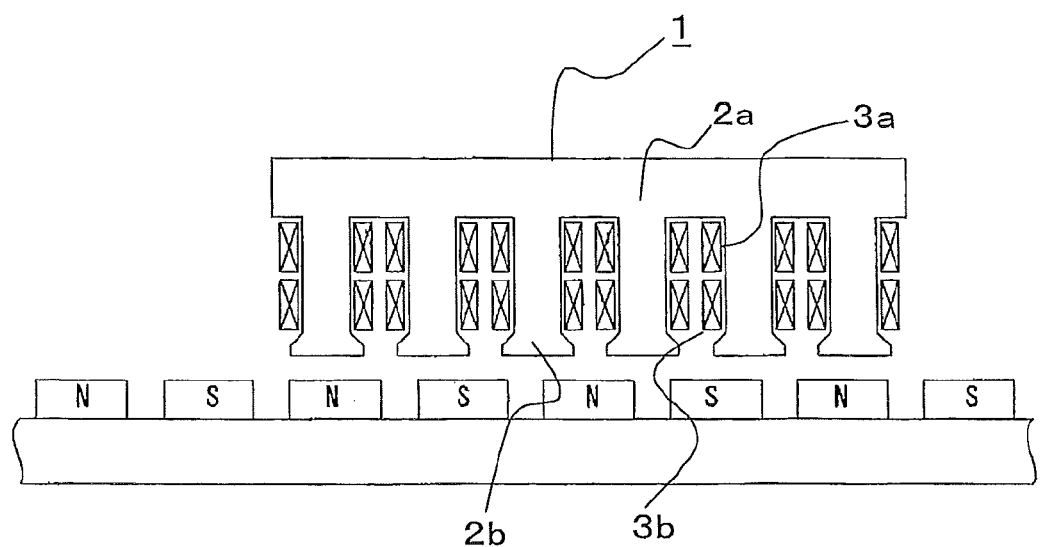
FIG. 26 is a view of an example in which an armature according to the present invention is applied to an armature in a linear motor.

In addition, the armature 1 according to the present invention is also applicable to a linear motor as shown in FIG. 26.

1 armature
2 armature element core
2c end face
2d side face
3a first coil
3b second coil
4e first-winding face
4f second-winding face
4g riser
4h 4k groove
4i partition
6 block
7 magnetic material

What is claimed is:

1. An armature, comprising:
a plurality of armature elements, wherein each of the armature elements includes:
an armature element core that has a predetermined core length and has end faces spaced apart in a core length direction and side faces connecting the end faces;
a first coil that is formed by winding a wire over the side faces and the end faces;
a second coil that is formed, after forming the first coil, by winding a wire over the side faces and the end faces so that on the side faces the second coil is formed contiguously to the first coil; and
an end structure member that is provided on each of the end faces, has a first-winding face and a second-winding face on which the wires of the first coil and the second coil are wound, respectively, and has a riser formed between the first-winding face and the second-winding face, the end structure member in which a vicinity of the riser on the second-winding face is positioned farther from the each of the end faces than the first-winding face.

2. The armature according to claim 1, wherein the each of the armature elements further comprises
a partition that is provided between the first coil and the second coil in a such manner that the partition extends from the riser.

3. The armature according to claim 2, wherein the each of the armature elements further comprises
a block that is provided farther from each of the end faces than the first coil so as to support the partition.

4. The armature according to claim 1, wherein the end structure member is in such a shape that the farther from the riser, portions of the second-winding face are positioned, the closer to the each of the end faces the portions of the second-winding face is positioned.

5. The armature according to claim 1, wherein
the end structure member is made of electrically insulating material and provided with a groove through which lead wires either or both of the first coil and the second coil are passed.

6. The armature according to claim 1, wherein the end structure member includes a portion that is made of magnetic material.

* * * * *